US011104430B2

(12) United States Patent
Fenny et al.

(10) Patent No.: US 11,104,430 B2
(45) Date of Patent: Aug. 31, 2021

(54) MULTIMODE POWERTRAINS FOR MULTI ENGINE ROTORCRAFT

(71) Applicant: Textron Innovations Inc., Providence, RI (US)

(72) Inventors: Carlos Alexander Fenny, Fort Worth, TX (US); Gilberto Morales, Arlington, TX (US); Ryan Thomas Ehinger, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 153 days.

(21) Appl. No.: 16/585,891

(22) Filed: Sep. 27, 2019

(65) Prior Publication Data

US 2021/0094698 A1 Apr. 1, 2021

(51) Int. Cl.
| | |
|---|---|
| *B64C 27/12* | (2006.01) |
| *F16D 25/00* | (2006.01) |
| *B64D 41/00* | (2006.01) |
| *F16D 41/12* | (2006.01) |
| *F16D 25/12* | (2006.01) |
| *F16H 1/28* | (2006.01) |

(52) U.S. Cl.
CPC .............. *B64C 27/12* (2013.01); *B64D 41/00* (2013.01); *F16D 25/00* (2013.01); *F16D 25/123* (2013.01); *F16D 41/12* (2013.01); *F16H 1/28* (2013.01)

(58) Field of Classification Search
CPC ...................................................... B64C 27/12
See application file for complete search history.

(56) References Cited

U.S. PATENT DOCUMENTS

| | | | | |
|---|---|---|---|---|
| 3,196,612 A | * | 7/1965 | Laville | B64C 27/12 |
| | | | | 60/788 |
| 3,255,825 A | * | 6/1966 | Mouille | B64C 27/12 |
| | | | | 416/170 R |
| 3,362,255 A | * | 1/1968 | De Rocca | B64C 27/12 |
| | | | | 74/665 L |
| 3,455,182 A | | 7/1969 | Kelley | |
| 4,756,395 A | | 7/1988 | Zlotek | |
| 6,042,499 A | * | 3/2000 | Goi | B64C 27/12 |
| | | | | 475/214 |
| 6,098,921 A | | 8/2000 | Piasecki | |
| 7,296,767 B2 | * | 11/2007 | Palcic | B64C 27/10 |
| | | | | 244/17.11 |
| 7,434,764 B2 | * | 10/2008 | Lappos | B64C 27/14 |
| | | | | 244/17.11 |

(Continued)

*Primary Examiner* — Joseph W Sanderson
(74) *Attorney, Agent, or Firm* — Lawrence Youst PLLC

(57) ABSTRACT

A powertrain for a rotorcraft includes first and second engines and a transmission system that includes a main rotor gearbox, a first freewheeling unit coupling the first engine to the main rotor gearbox and a second freewheeling unit coupling the second engine to the main rotor gearbox. The first freewheeling unit has a driving configuration and a bypass configuration. In a preflight configuration of the rotorcraft, the first engine provides power to at least one auxiliary component with the first freewheeling unit in the bypass configuration while the second engine provides power to the main rotor. In a flight configuration of the rotorcraft, the first engine provides power to the main rotor with the first freewheeling unit in the driving configuration while the second engine also provides power to the main rotor.

18 Claims, 8 Drawing Sheets

(56) References Cited

U.S. PATENT DOCUMENTS

| | | | |
|---|---|---|---|
| 8,133,155 B2* | 3/2012 | Ehinger | B64C 27/12 477/124 |
| 8,840,057 B2* | 9/2014 | Moret | B64C 27/12 244/6 |
| 8,845,489 B2* | 9/2014 | Vialle | F02C 7/36 477/55 |
| 8,950,700 B2 | 2/2015 | Westhuizen | |
| 8,967,532 B2* | 3/2015 | Vialle | B64C 27/28 244/60 |
| 9,180,964 B2* | 11/2015 | Smith | B64C 27/006 |
| 9,248,907 B2* | 2/2016 | Smiley | F02C 7/26 |
| 9,387,934 B2* | 7/2016 | Gomez | B64D 31/06 |
| 9,580,184 B2 | 2/2017 | Bornes | |
| 10,040,566 B2 | 8/2018 | Waltner | |
| 10,301,035 B2* | 5/2019 | Bedrine | B64D 41/00 |
| 10,618,642 B2* | 4/2020 | De Meerschman | F16H 1/28 |
| 10,946,954 B2* | 3/2021 | Ehinger | B64C 27/28 |
| 2006/0269414 A1* | 11/2006 | Palcic | B64C 27/22 416/170 R |
| 2007/0125907 A1* | 6/2007 | Lappos | B64C 27/14 244/60 |
| 2008/0173752 A1* | 7/2008 | Palcic | B64C 27/22 244/17.11 |
| 2009/0222178 A1* | 9/2009 | Vialle | B64C 27/12 701/54 |
| 2010/0212326 A1* | 8/2010 | Vialle | B64C 27/12 60/778 |
| 2011/0015034 A1* | 1/2011 | Ehinger | B64C 27/12 477/70 |
| 2013/0134253 A1* | 5/2013 | Carter, Jr. | B64C 27/12 244/17.11 |
| 2014/0145028 A1* | 5/2014 | Gomez | B64D 31/00 244/58 |
| 2014/0202821 A1* | 7/2014 | Schotten | F16D 41/084 192/45.1 |
| 2014/0263820 A1* | 9/2014 | Smith | B64C 27/006 244/17.13 |
| 2015/0143950 A1* | 5/2015 | Bedrine | B64C 27/12 74/661 |
| 2017/0073066 A1* | 3/2017 | De Meerschman | F16H 1/28 |
| 2017/0225573 A1* | 8/2017 | Waltner | B64D 27/24 |
| 2018/0170569 A1* | 6/2018 | Brodeur | F01P 3/20 |
| 2019/0016451 A1* | 1/2019 | Ehinger | F16H 59/44 |
| 2019/0382124 A1* | 12/2019 | Massot | B64C 27/12 |

* cited by examiner

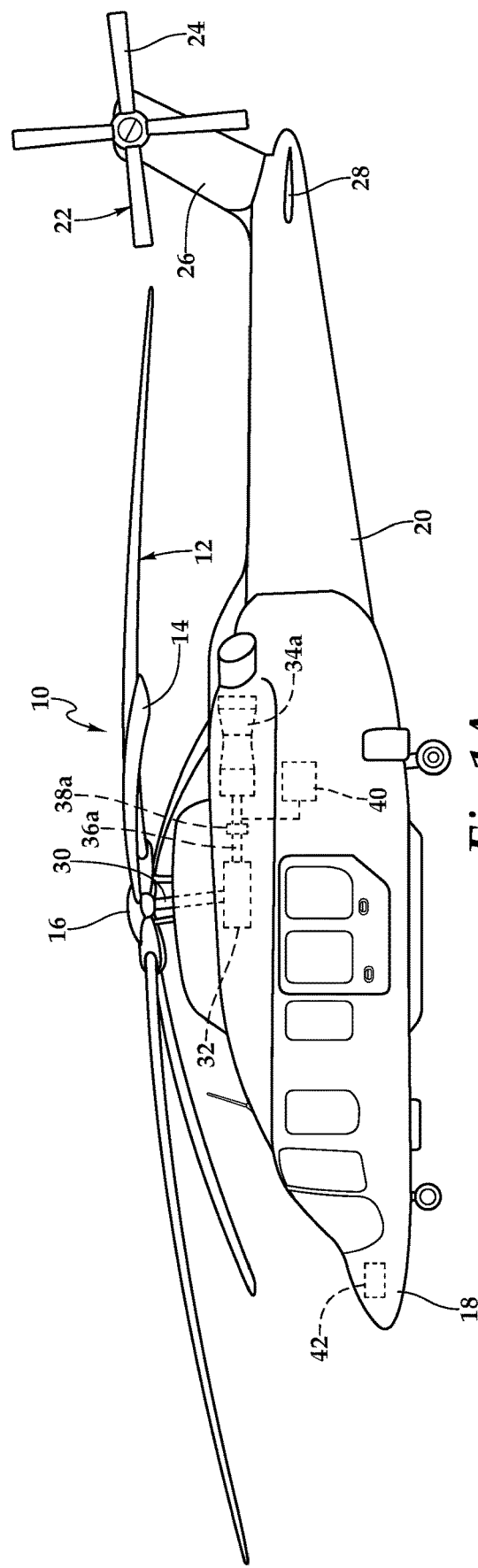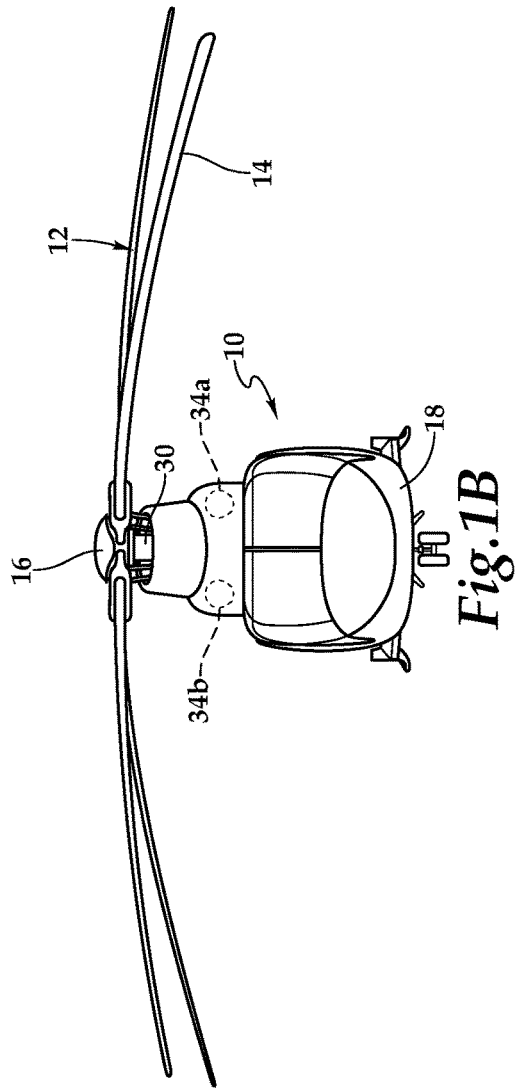
Fig.1A
Fig.1B

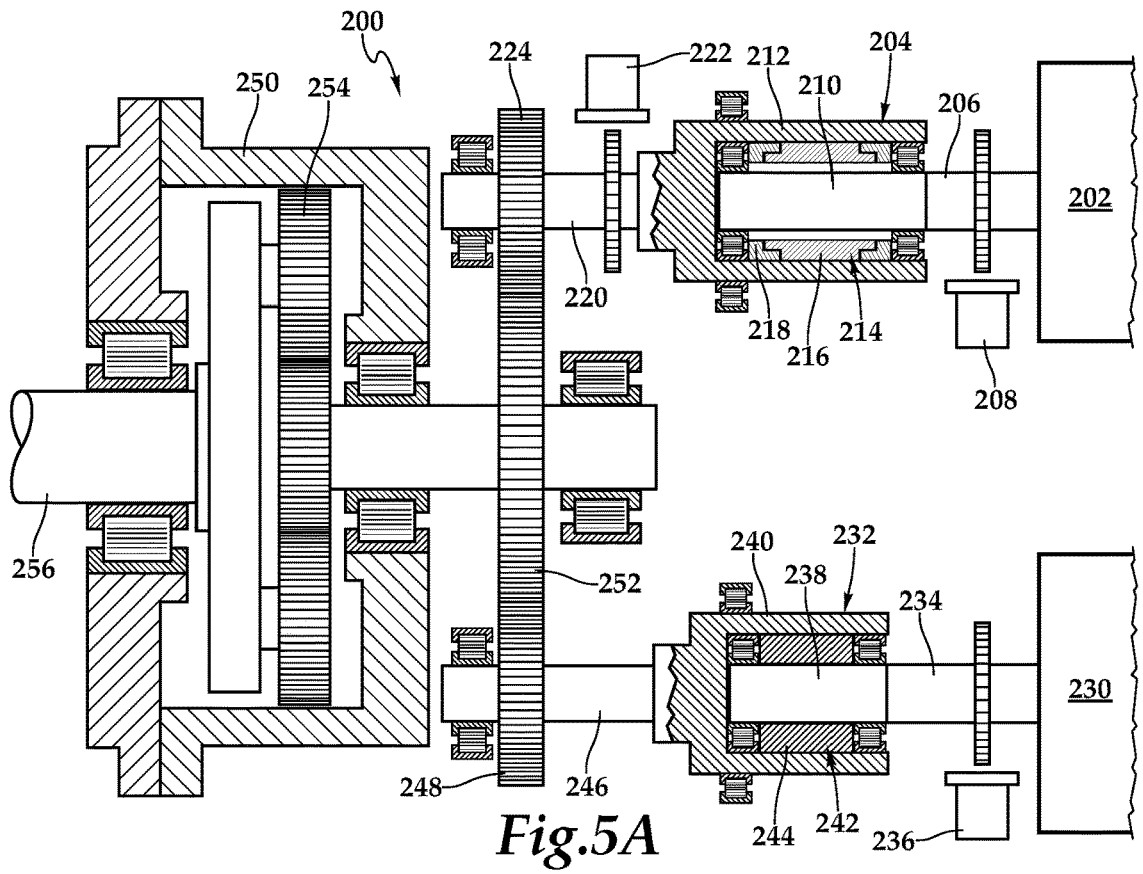
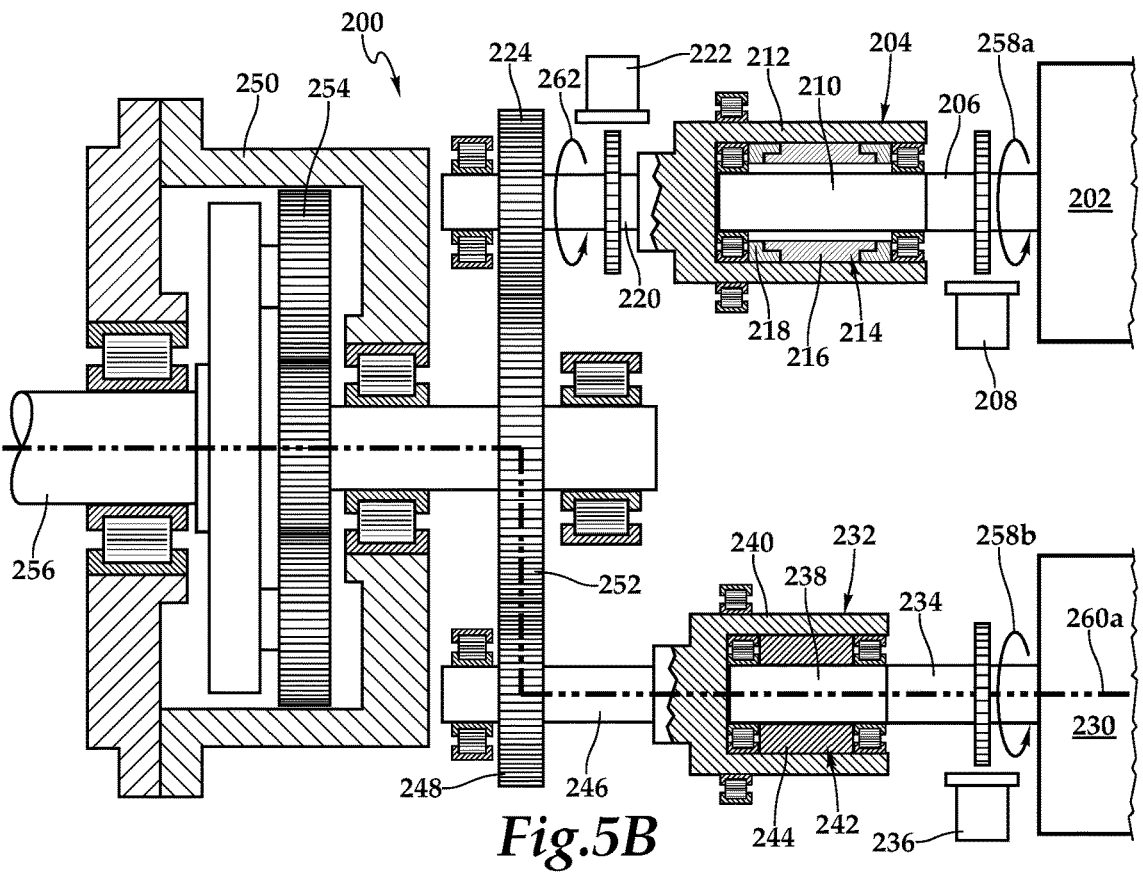

MULTIMODE POWERTRAINS FOR MULTI ENGINE ROTORCRAFT

TECHNICAL FIELD OF THE DISCLOSURE

The present disclosure relates, in general, to rotorcraft having multiple engines operable to drive the main rotor assembly and, in particular, to multi engine rotorcraft having a multimode powertrain that enables an engine to operate as an auxiliary power unit during preflight operations and as a main engine during flight operations.

BACKGROUND

During preflight operations of a rotorcraft, power is needed to operate accessories such as generators and air pumps. Certain multi engine rotorcraft utilize a dedicated auxiliary power unit to generate preflight accessory power. It has been found, however, that having a dedicated auxiliary power unit for preflight accessory power adds cost and weight to the rotorcraft as well as adding to aircraft complexity and maintenance requirements. Other multi engine rotorcraft have attempted to utilize one of the main engines to provide auxiliary power during preflight operations without that main engine providing power to the main rotor assembly. For example, a dedicated clutch has been added to the powertrain the enables one of the main engines to be disengaged from the reminder of the powertrain to allow that main engine to provide auxiliary power during preflight operations. It has been found, however, that such dedicated clutches add cost, weight and complexity to the rotorcraft. In addition, it has been found, that when it is desired to transition the main engine from supplying auxiliary power to supplying main rotor power, precise speed matching of splined couplings is required during engagement, which has resulted in such dedicated clutches becoming high maintenance items. Accordingly, a need has arisen for an improved powertrain for multi engine rotorcraft that enables an engine to operate as an auxiliary power unit during preflight operations and as a main engine during flight operations but without adding undue cost, weight or complexity to the rotorcraft.

SUMMARY

In a first accept, the present disclosure is directed to a powertrain for a rotorcraft having a main rotor and at least one auxiliary component. The powertrain includes first and second engines and a transmission system that includes a main rotor gearbox, a first freewheeling unit coupling the first engine to the main rotor gearbox and a second freewheeling unit coupling the second engine to the main rotor gearbox. The first freewheeling unit has an input side coupled to the first engine and an output side coupled to the main rotor gearbox. The first freewheeling unit has a driving configuration in which torque applied to the input side is transferred to the output side and torque applied to the output side is not transferred to the input side. The first freewheeling unit also has a bypass configuration in which torque applied to the input side is not transferred to the output side and torque applied to the output side is not transferred to the input side. In a first preflight configuration of the rotorcraft, the first engine provides power to the at least one auxiliary component with the first freewheeling unit in the bypass configuration while the second engine provides power to the main rotor through the second freewheeling unit and the main rotor gearbox. In a flight configuration of the rotorcraft, the first engine provides power to the main rotor through the first freewheeling unit and the main rotor gearbox with the first freewheeling unit in the driving configuration while the second engine provides power to the main rotor through the second freewheeling unit and the main rotor gearbox.

In some embodiments, the first engine may have a power rating that is the same as the power rating of the second engine. In other embodiments, the first engine may have a power rating that is different from the power rating of the second engine. For example, the power rating of the second engine may be greater than the power rating of the first engine. In certain embodiments, both the first and second engines may be gas turbine engines. In some embodiments, the input side of the first freewheeling unit may include an inner race, the output side of the first freewheeling unit may include an outer race and a sprag assembly may be disposed between the inner race and the outer race. In such embodiments, in the driving configuration, the sprag assembly may have an engaged position with the inner race and in the bypass configuration, the sprag assembly may have a disengaged position with the inner race.

In certain embodiments, a hydraulic actuator may be in fluid communication with the first freewheeling unit. In such embodiments, the hydraulic actuator may be configured to provide a first fluid pressure state to operate the sprag assembly from the disengaged position to the engaged position and a second fluid pressure state to operate the sprag assembly from the engaged position to the disengaged position. For example, the first fluid pressure state may be a higher pressure state than the second fluid pressure state. Alternatively, the first fluid pressure state may be a lower pressure state than the second fluid pressure state. In some embodiments, the hydraulic actuator may include an electric motor or a hydraulic accumulator. In certain embodiments, the hydraulic actuator may be part of a fluid lubrication system for the first freewheeling unit. In some embodiments, the hydraulic actuator may be in fluid communication with the first engine.

In certain embodiments, the rotorcraft may have a second preflight configuration in which the first engine does not provide power to the main rotor with the first freewheeling unit in the driving configuration while the second engine provides power to the main rotor through the second freewheeling unit and the main rotor gearbox with the second engine operating at a higher speed than the first engine. In some embodiments, the rotorcraft may have a third preflight configuration in which the first engine provides power to the main rotor through the first freewheeling unit and the main rotor gearbox with the first freewheeling unit in the driving configuration while the second engine provides power to the main rotor through the second freewheeling unit and the main rotor gearbox with the second engine operating at substantially the same speed as the first engine.

In a second aspect, the present disclosure is directed to a rotorcraft that includes a fuselage, a main rotor coupled to the fuselage and operable to rotate relative thereto, first and second engines, a transmission system that includes a main rotor gearbox coupled to the main rotor, a first freewheeling unit coupling the first engine to the main rotor gearbox and a second freewheeling unit coupling the second engine to the main rotor gearbox and at least one auxiliary component coupled to the first engine. The first freewheeling unit has an input side coupled to the first engine and an output side coupled to the main rotor gearbox. The first freewheeling unit has a driving configuration in which torque applied to the input side is transferred to the output side and torque applied to the output side is not transferred to the input side. The first freewheeling unit also has a bypass configuration in which torque applied to the input side is not transferred to the output side and torque applied to the output side is not transferred to the input side. In a first preflight configuration of the rotorcraft, the first engine provides power to the at least one auxiliary component with the first freewheeling unit in the bypass configuration while the second engine provides power to the main rotor through the second freewheeling unit and the main rotor gearbox. In a flight configuration of the rotorcraft, the first engine provides power to the main rotor through the first freewheeling unit and the main rotor gearbox with the first freewheeling unit in the driving configuration while the second engine provides power to the main rotor through the second freewheeling unit and the main rotor gearbox.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1B are schematic illustrations of a rotorcraft having a multimode powertrain in accordance with embodiments of the present disclosure;

FIGS. 5A-5D are schematic illustrations of a multimode powertrain in accordance with embodiments of the present disclosure.

DETAILED DESCRIPTION

Figure 2A:
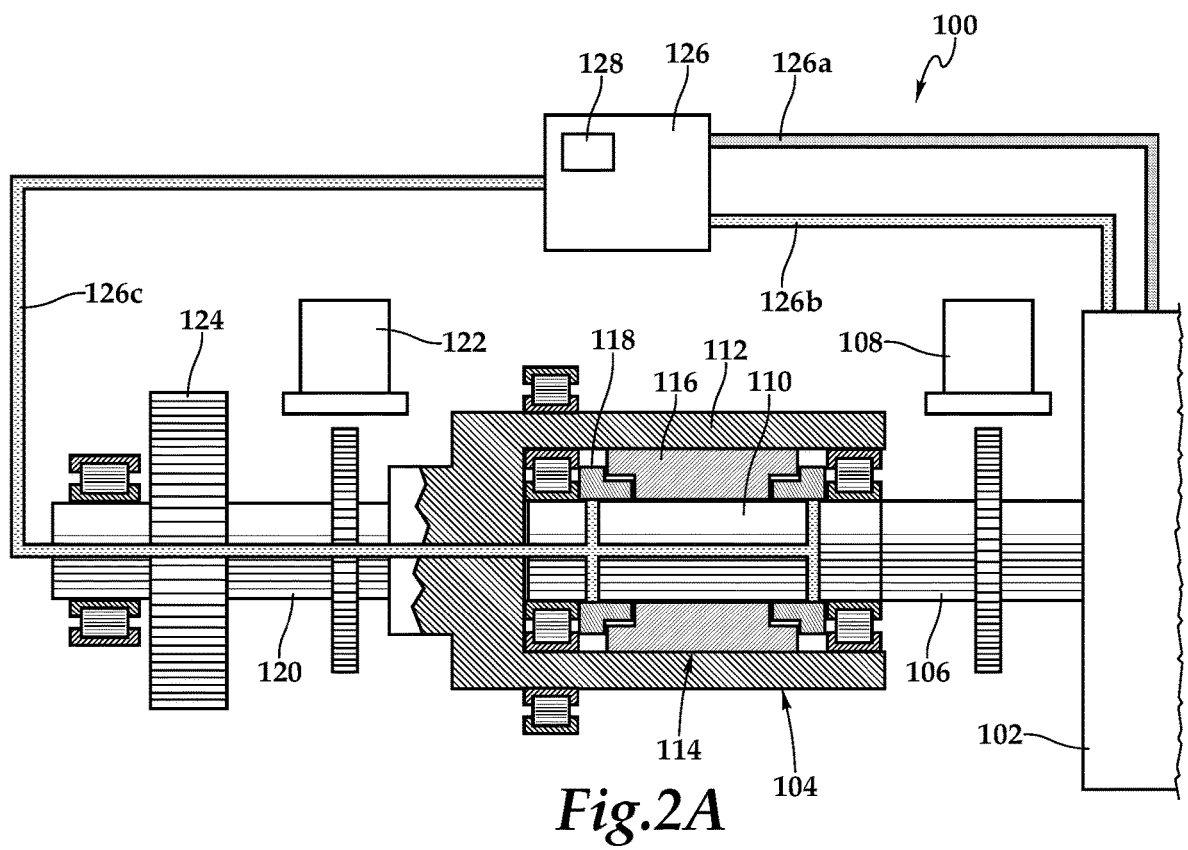
FIGS. 2A-2B are schematic illustrations of an actuation system for a multimode powertrain in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1B in the drawings, a rotorcraft in the form of a helicopter is schematically illustrated and generally designated 10. The primary propulsion for helicopter 10 is provided by a main rotor assembly 12. Main rotor assembly 12 includes a plurality of rotor blades 14 extending radially outward from a main rotor hub 16. The pitch of rotor blades 14 can be collectively and/or cyclically manipulated to selectively control direction, thrust and lift of helicopter 10. Helicopter 10 includes a fuselage 18. A tailboom 20 is coupled to fuselage 18 and extends from fuselage 18 in the aft direction. An anti-torque system 22 includes a tail rotor assembly 24 coupled to a vertical fin 26 extending from the aft end of tailboom 20. Anti-torque system 22 controls the yaw of helicopter 10 by counteracting the torque exerted on fuselage 18 by main rotor assembly 12. In the illustrated embodiment, helicopter 10 includes horizontal stabilizers 28 that extend laterally from tailboom 20.

Main rotor assembly 12 is supported atop helicopter 10 by a mast 30, which connects main rotor assembly 12 to a main rotor gearbox 32. Main rotor gearbox 32 includes a plurality of gears that are mechanically coupled to a pair of engines 34a, 34b that provide torque and rotational energy for main rotor assembly 12 via main rotor gearbox 32 and respective driveshafts and clutches, only driveshaft 36a and clutch 38a being visible in the figure. Main rotor gearbox 32 includes a transmission that is used to adjust the engine output speed from the driveshafts to a suitable rotational speed for mast 30 so that main rotor assembly 12 rotates at a desired speed. Collectively, engines 34a, 34b, the driveshafts, the clutches, the gearboxes including main rotor gearbox 32 and mast 30 may be referred to as the powertrain of helicopter 10. In the illustrated embodiment, during preflight operations, engine 34a may operate as an auxiliary power unit to provide preflight power to one or more accessories 40 of helicopter 10 such as electric generators, hydraulic pumps, air pumps and the like. During flight operations, engine 34a provides power to drive main rotor assembly 12 that is additive with the power provided by engine 34b. As such, helicopter 10 has a multimode powertrain in which engine 34a is operable as an auxiliary power unit during preflight operations and as a main engine during flight operations. Helicopter 10 includes a flight control computer 42 that implements a plurality of flight control modules such as a multimode powertrain control module, which may utilize software, firmware and/or hardware components of flight control computer 42. In the illustrated embodiment, helicopter 10 is a fly-by-wire rotorcraft.

It should be appreciated that helicopter 10 is merely illustrative of a variety of aircraft that can implement the embodiments disclosed herein. Indeed, the multimode powertrain of the present disclosure may be implemented on any rotorcraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones and the like. As such, those skilled in the art will recognize that the multimode powertrain of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 2B:
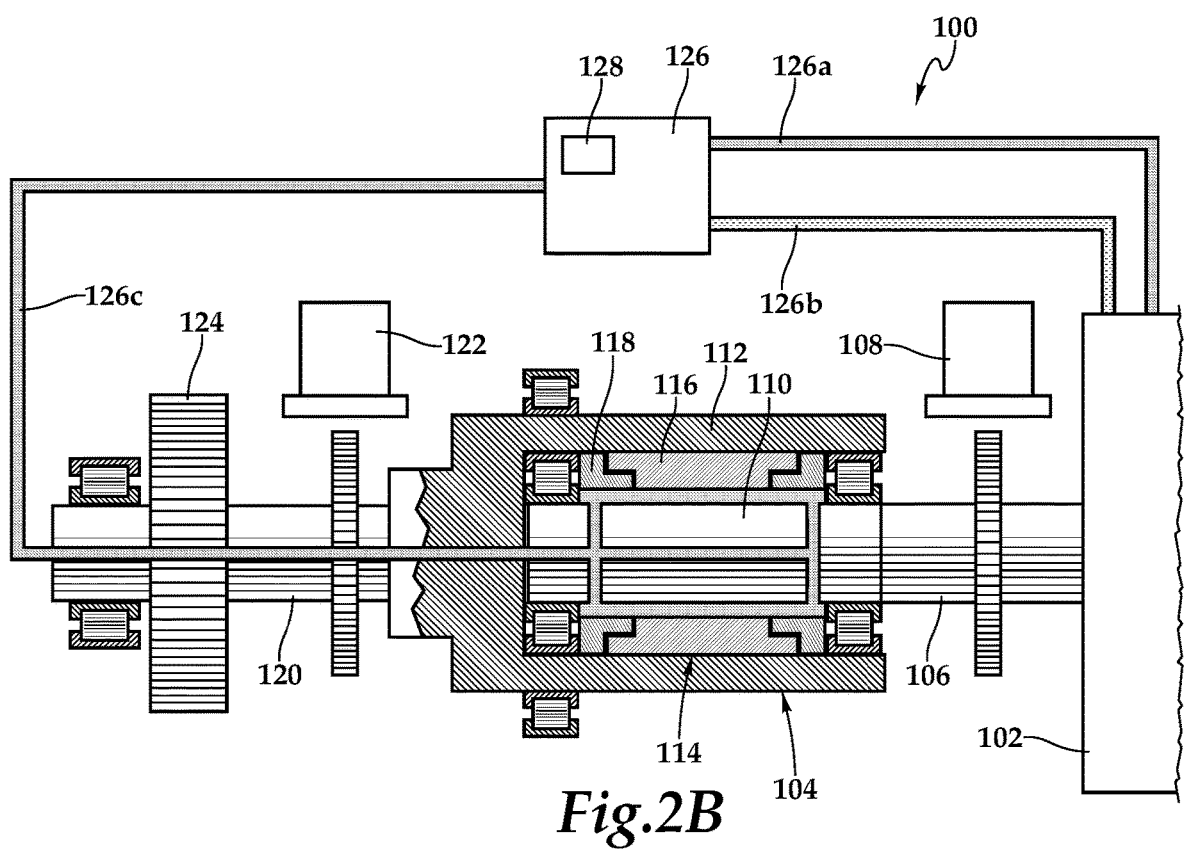

Referring to FIGS. 2A-2B in the drawings, a portion of a multimode powertrain for a rotorcraft is schematically illustrated and generally designated 100. In the illustrated portion, multimode powertrain 100 includes an engine 102 such as a turbo shaft engine capable of producing 2000 to 4000 horsepower or more, depending upon the particular implementation. Engine 102 is coupled to a freewheeling unit depicted as sprag clutch 104 via an input shaft 106. In the illustrated embodiment, input shaft 106 is coupled to a speed sensor 108 that is operable to detect the input side speed of sprag clutch 104 and communicate with flight control computer 42. Input shaft 106 is integral with or coupled to an inner race 110 of sprag clutch 104. Positioned radially outwardly from inner race 110, sprag clutch 104 includes an outer race 112. A sprag assembly 114 is retained in the radial space between inner race 110 and outer race 112. In the illustrated embodiment, sprag assembly 114 includes a plurality of circumferentially distributed sprag elements 116 and a plurality of lift elements 118, each of which is disposed between inner race 110 and outer race 112. Outer race 112 is integral with or coupled to an output shaft 120. In the illustrated embodiment, output shaft 120 is coupled to a speed sensor 122 that is operable to detect the output side speed of sprag clutch 104 and communicate with flight control computer 42. Output shaft 120 is also coupled to an output gear 124, which couples the output side of sprag clutch 104 to the main rotor gearbox of helicopter 10.

In the driving configuration of sprag clutch 104 depicted in FIG. 2A, sprag elements 116 mechanically couple inner race 110 to outer race 112 by a wedging action when the input side rotating speed of sprag clutch 104 is matched with the output side rotating speed of sprag clutch 104. Also in the driving configuration, sprag clutch 104 has an overrunning mode wherein engine 102 is decoupled from main rotor assembly 12 when the input side rotating speed of sprag clutch 104 is less than the output side rotating speed of sprag clutch 104 such that sprag elements 116 are no longer wedged between inner race 110 to outer race 112. Operating sprag clutch 104 in the overrunning mode allows, for example, main rotor assembly 12 of helicopter 10 to engage in an autorotation and flare recovery maneuver, in the event of an engine failure. Thus, in the driving configuration, sprag clutch 104 acts as a one-way clutch operable for unidirectional torque transfer from the input side to the output side.

In the bypass configuration of sprag clutch 104 depicted in FIG. 2B, sprag elements 116 are pivoted by lift elements 118 such that sprag elements 116 are disengaged from inner race 110. In this configuration, sprag elements 116 are unable to mechanically couple inner race 110 to outer race 112 regardless of the input side rotating speed such that torque is not coupled through sprag clutch 104 from the input side to the output side. Also in the bypass configuration, sprag clutch 104 has an overrunning mode wherein engine 102 is decoupled from main rotor assembly 12 when the input side rotating speed of sprag clutch 104 is less than the output side rotating speed of sprag clutch 104. Thus, in the bypass configuration, sprag clutch 104 acts as a fully disengaged clutch operable for no torque transfer in either direction.

To shift sprag clutch 104 between the driving configuration and the bypass configuration, multimode powertrain 100 includes a hydraulic actuator 126, the operation of which is preferably controlled by flight control computer 42. In the illustrated embodiment, hydraulic actuator 126 is part of a fluid lubrication system for sprag clutch 104 that is operable to access pressurized oil from engine 102 via circulation loop 126a, 126b for fluid lubrication functionality via lubrication channels 126c. It is noted that in FIG. 2A, the low density stippling within lubrication channels 126c indicates a fluid pressure having a fluid pressure state that is sufficient for lubricating sprag clutch 104 but insufficient to actuate sprag clutch 104 to the bypass configuration. In addition, hydraulic actuator 126 is operable to use the pressurized oil from engine 102 to actuate sprag clutch 104 to the bypass configuration as long as engine 102 is operating. When engine 102 is operating, hydraulic actuator 126 can provide fluid pressure having a fluid pressure state that is sufficient to lubricating sprag clutch 104 and to actuate sprag clutch 104 to the bypass configuration, as indicated by the high density stippling within lubrication channels 126c and between inner race 110, sprag elements 116 and lift elements 118 in FIG. 2B. The high pressure fluid radially biases lift elements 118 outwardly which causes sprag elements 116 to pivot away from inner race 110 and thus disengage therefrom. If engine 102 is not operating, hydraulic actuator 126 is operable to use an alternate pressure source 128, such as an electric motor and hydraulic pump or pressure from a hydraulic accumulator, to actuate sprag clutch 104 to the bypass configuration. It is noted that sprag clutch 104 defaults to the driving configuration and must be actuated to the bypass configuration responsive to sufficient pressure.

Figure 3A:
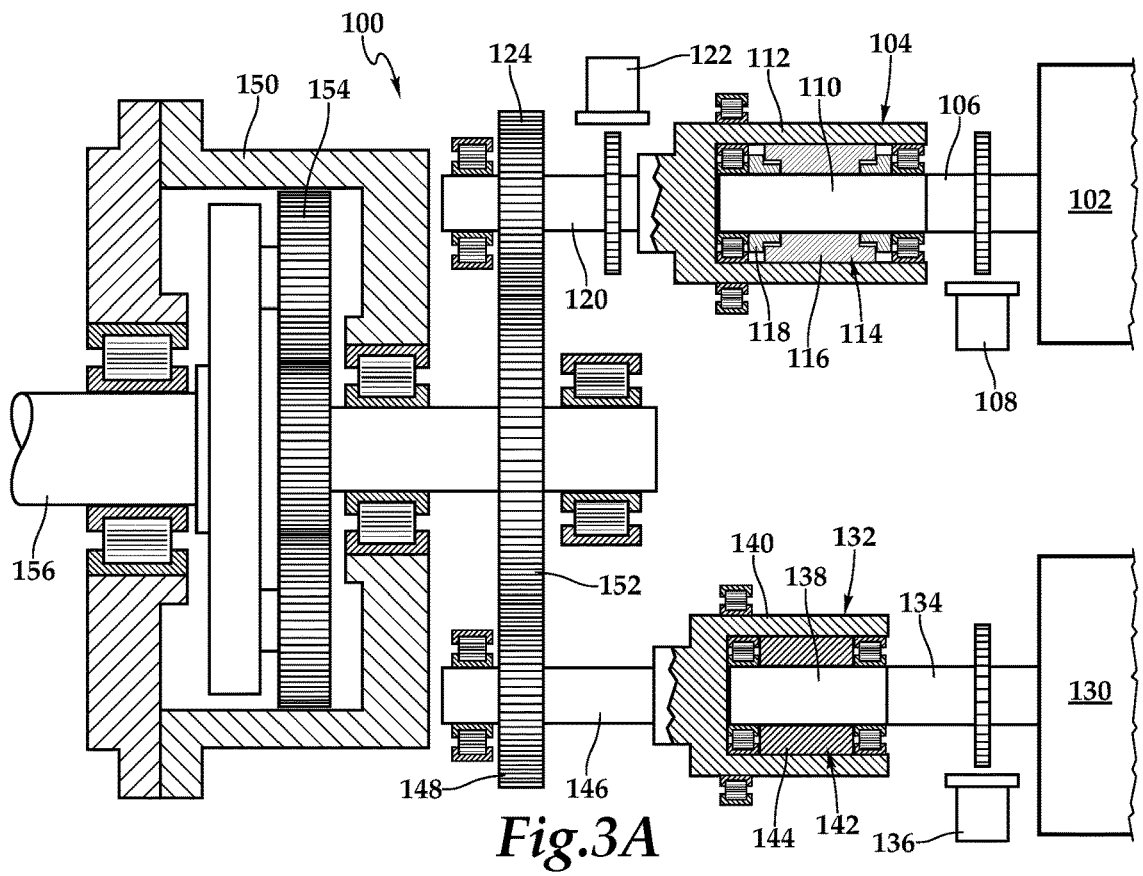
FIGS. 3A-3F are schematic illustrations of a multimode powertrain in accordance with embodiments of the present disclosure.

Referring additionally to FIG. 3A in the drawings, a larger portion of multimode powertrain 100 is depicted. As stated herein, multimode powertrain 100 includes engine 102, sprag clutch 104, input side speed sensor 108, output side speed sensor 122 and output gear 124. Multimode powertrain 100 also includes an engine 130 such as a turbo shaft engine capable of producing 2000 to 4000 horsepower or more, depending upon the particular implementation. It is noted that engine 102 and engine 130 may have the same power rating or could have different power ratings. For example, engine 102 could have a lower power rating than engine 130 or engine 102 could have a higher power rating than engine 130. Engine 130 is coupled to a freewheeling unit depicted as sprag clutch 132 via an input shaft 134. In the illustrated embodiment, input shaft 134 is coupled to a speed sensor 136 that is operable to detect the input side speed of sprag clutch 130 and communicate with flight control computer 42. Input shaft 134 is integral with or coupled to an inner race 138 of sprag clutch 132. Positioned radially outwardly from inner race 138, sprag clutch 132 includes an outer race 140. A sprag assembly 142 is retained in the radial space between inner race 138 and outer race 140. In the illustrated embodiment, sprag assembly 142 includes a plurality of circumferentially distributed sprag elements 144, each of which is disposed between inner race 138 and outer race 140. Outer race 140 is integral with or coupled to an output shaft 146. In the illustrated embodiment, output shaft 146 is coupled to an output gear 148, which couples the output side of sprag clutch 132 to main rotor gearbox 150.

As sprag clutch 132 does not include lift elements, sprag clutch 132 does not have a bypass configuration but instead, only has a driving configuration in which sprag elements 144 mechanically couple inner race 138 to outer race 140 by a wedging action when the input side rotating speed of sprag clutch 132 is matched with the output side rotating speed of sprag clutch 132. Sprag clutch 132 has an overrunning mode wherein engine 130 is decoupled from main rotor assembly 12 when the input side rotating speed of sprag clutch 132 is less than the output side rotating speed of sprag clutch 132 such that sprag elements 144 are no longer wedged between inner race 138 and outer race 140. Operating sprag clutch 132 in the overrunning mode allows, for example, main rotor assembly 12 of helicopter 10 to engage in an autorotation and flare recovery maneuver, in the event of an engine failure. Thus, sprag clutch 132 acts as a one-way clutch operable for unidirectional torque transfer from the input side to the output side.

Output gear 124 and output gear 148 mesh with an input gear 152 in a combined gearbox that may be integral with or independent of main rotor gearbox 150. Main rotor gearbox 150 includes a gearbox housing and a reduction gear system 154, such as planetary gears, used to adjust the engine output speed to a suitable rotational speed for main rotor assembly 12 so that engine 102, engine 130 and main rotor assembly 12 may each rotate at optimum speed during flight operations of helicopter 10. Reduction gear system 154 is coupled to mast 156 that drives main rotor assembly 12 of helicopter 10.

Figure 3B:
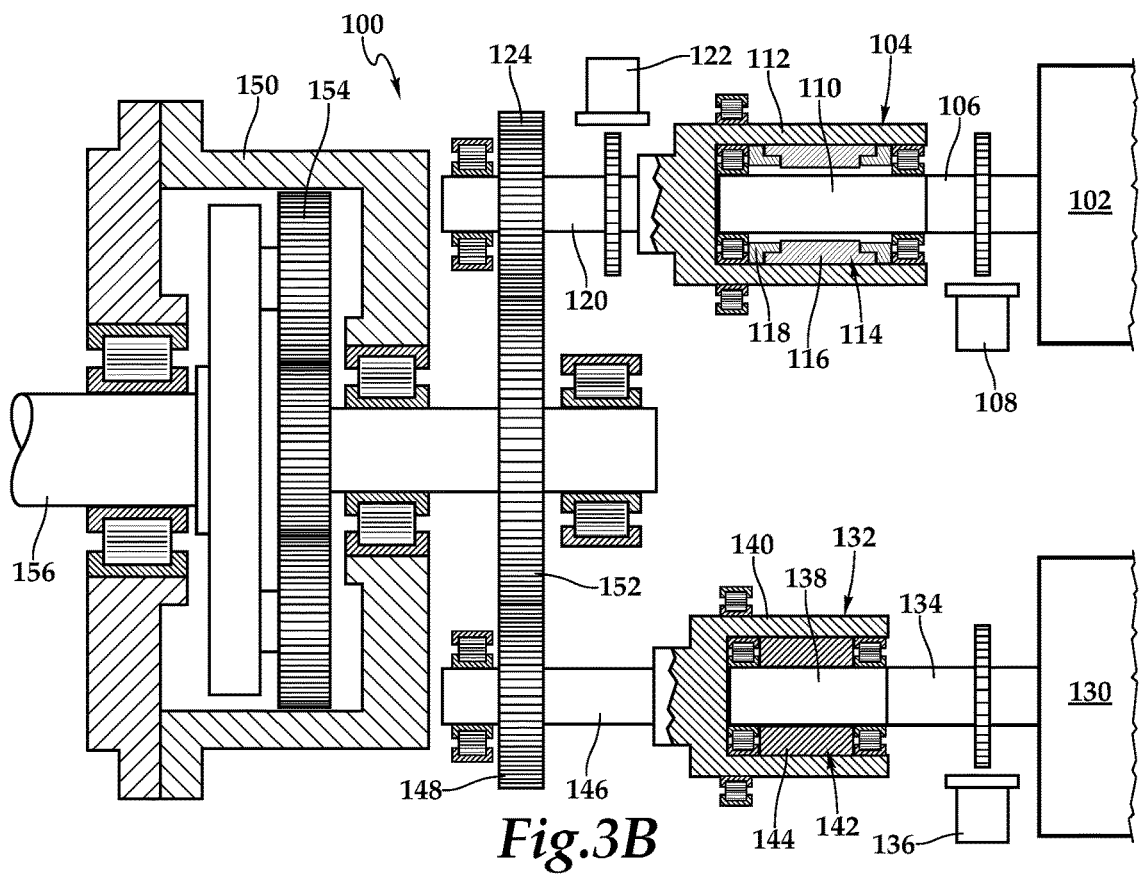
Figure 3C:
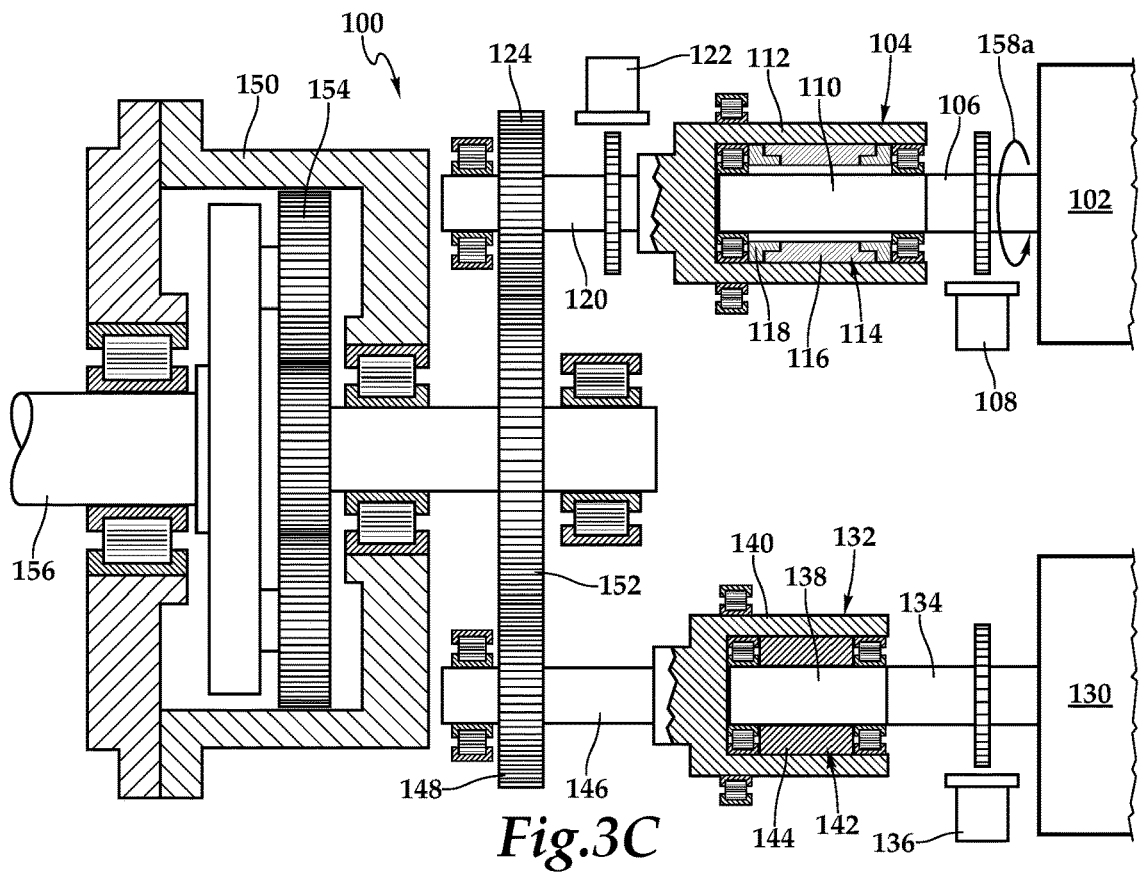

The operation of multimode powertrain 100 will now be described with reference to FIGS. 2A-2B and 3A-3F. FIG. 3A represents multimode powertrain 100 in a preflight configuration with neither of engines 102, 130 operating. In this resting state, sprag clutch 104 is in its default configuration which is the driving configuration of sprag clutch 104. When it is desired to commence preflight operations of helicopter 10, certain of the accessories 40 of helicopter 10 must be turned on. In the illustrated embodiment, engine 102 provides power to accessories 40. This is achieved by first actuating sprag clutch 104 to the bypass configuration with hydraulic actuator 126 using hydraulic pressure from alternate pressure source 128 as oil pressure from engine 102 is not available. Using hydraulic pressure from alternate pressure source 128, hydraulic actuator 126 actuates sprag clutch 104 to the bypass configuration, as best seen in FIG. 3B, which represents a preflight configuration of multimode powertrain 100. In this configuration, lift elements 118 pivot sprag elements 116 away from inner race 110 responsive to the fluid pressure. Engine 102 may now be started and operated at a desired speed, such as idle speed, to power accessories 40, as best seen in FIG. 3C and as represented by arrow 158a. As sprag clutch 104 is in the bypass configuration, the rotation of input shaft 106 and inner race 110 is not coupled to outer race 112 and no torque is transmitted through sprag clutch 104 to output shaft 120. This represents a preflight configuration of multimode powertrain 100. Once engine 102 is operating, hydraulic actuator 126 can use oil pressure from engine 102 to maintain sprag clutch 104 in the bypass configuration.

Figure 3D:
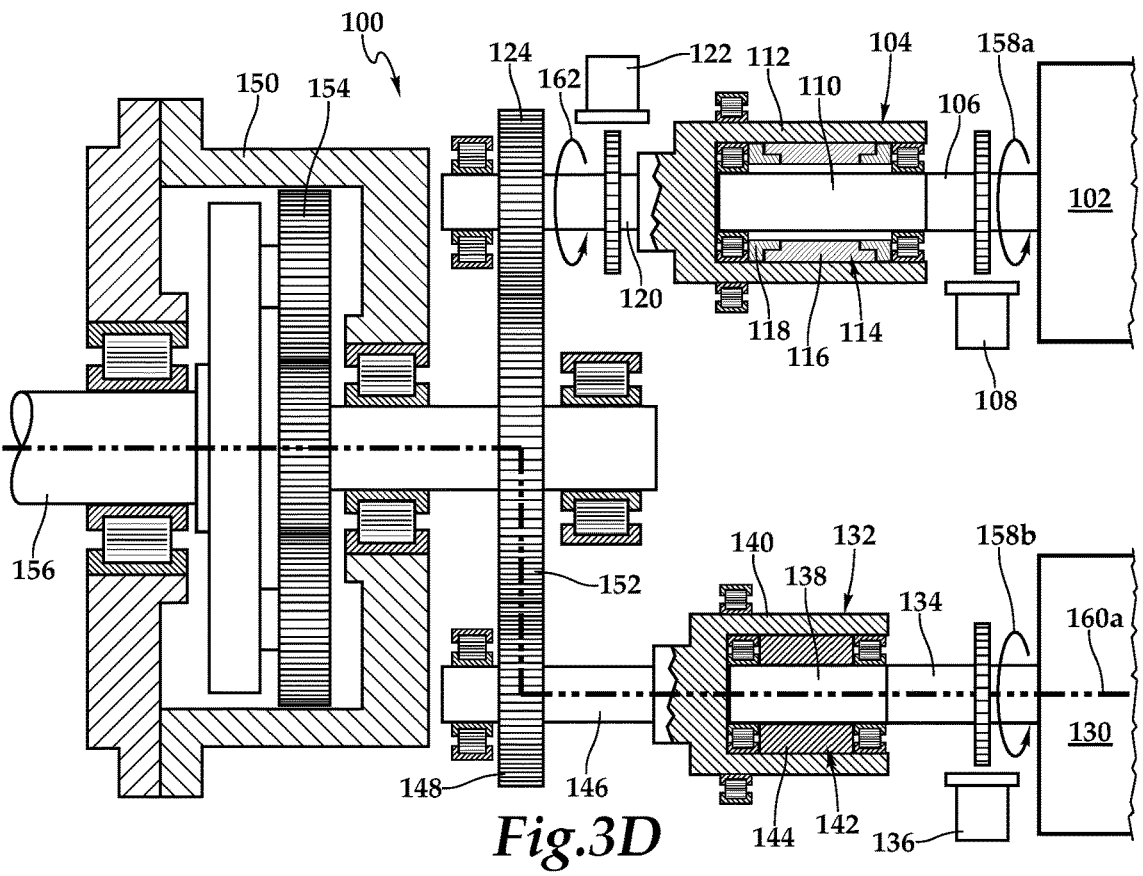

As best seen in FIG. 3D, engine 130 has now been started and is operating at a desired speed, preferably a speed of 102 percent to 105 percent of idle speed. Operation of engine 130 causes rotation of input shaft 134, as indicated by arrow 158b. This rotation causes rotation of inner race 138 which is coupled to outer race 140 as sprag clutch 132 is operating as a one-way clutch. Thus, torque is delivered from engine 130 and transmitted through sprag clutch 132 to output shaft 146, output gear 148, input gear 152 and gear system 154 to mast 156 as indicated by torque line 160a. Input gear 152 also rotates output shaft 120, as indicated by arrow 162. The speed of output shaft 120 is generally matched to the speed of engine 130 when input gear 152 is driving output shaft 120. Engine 102 continues to operate at idle speed providing power to accessories 40. With sprag clutch 104 in the bypass configuration, no torque being transmitted through sprag clutch 104. This represents a preflight configuration of multimode powertrain 100.

Figure 3E:
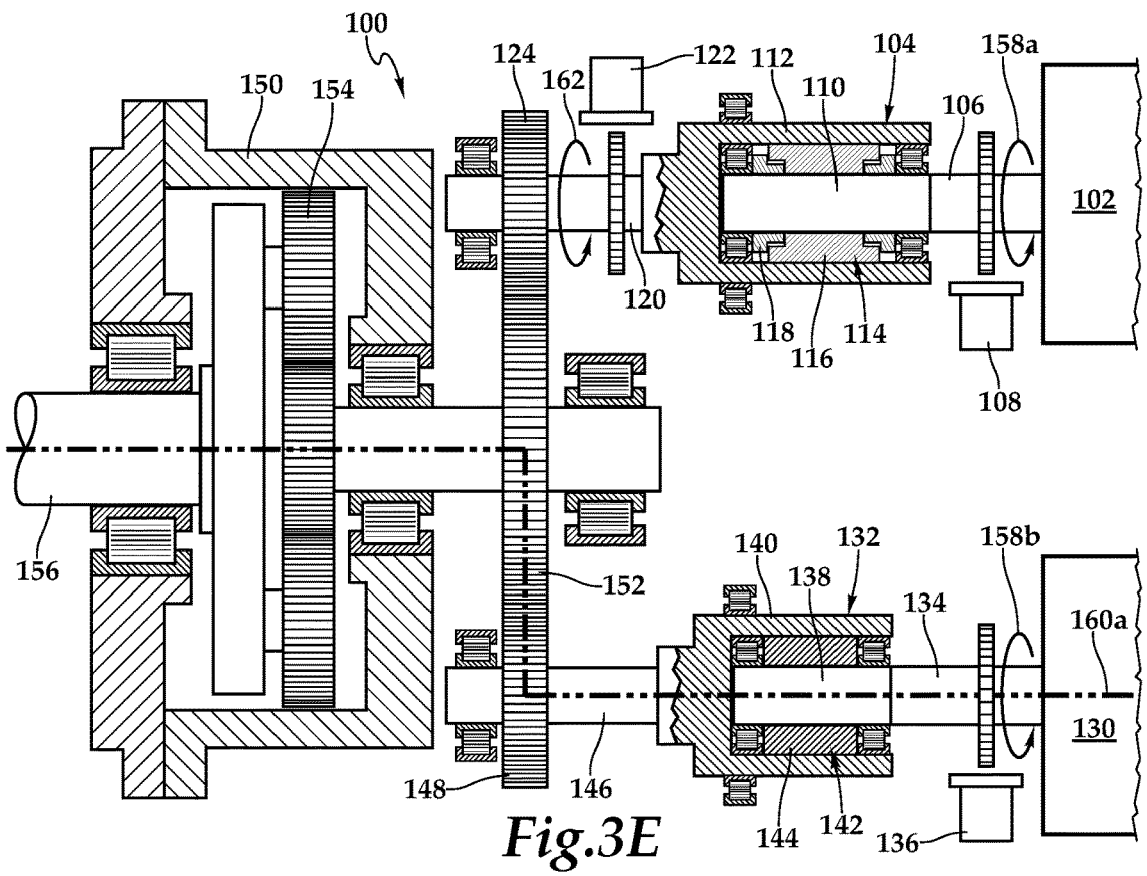

When it is desired to transition helicopter 10 from preflight operations to flight operations, power from engine 102 is supplied to main rotor assembly 12. This is achieved by first transitioning sprag clutch 104 from the bypass configuration to the driving configuration. In the illustrated embodiment, flight control computer 42 determines whether the input side rotating speed is less than the output side rotating speed of sprag clutch 104 based upon data from speed sensors 108, 122 and/or 136. Preferably, engine 102 is operating at idle speed and engine 130 is operating above idle speed such that the input side rotating speed is less than the output side rotating speed of sprag clutch 104. This speed relationship is desired for the transition from the bypass configuration to the driving configuration of sprag clutch 104 so that upon entry into the driving configuration, sprag clutch 104 will be in overrunning mode. If the data from speed sensors 108, 122 and/or 136 confirms the desired speed relationship, hydraulic actuator 126 reduces the fluid pressure state in sprag clutch 104, which transitions sprag clutch 104 from the bypass configuration to the driving configuration as lift elements 118 are no longer radially outwardly biased by sufficient fluid pressure to pivot sprag elements 116 away from inner race 110, as best seen in FIG. 3E. Sprag clutch is now in the driving configuration operating in overrunning mode with no torque transfer therethrough. This represents a preflight configuration of multimode powertrain 100.

Figure 3F:
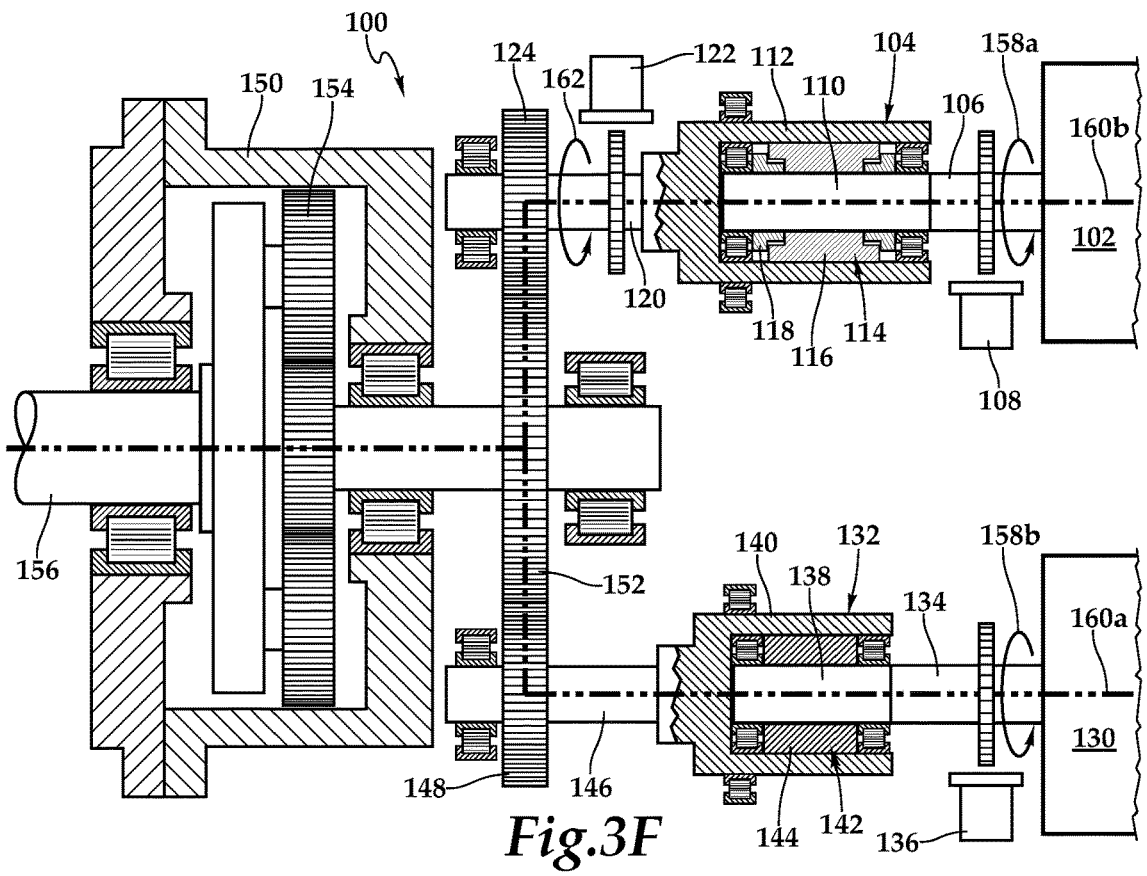

The operating speed of engine 102 may now be ramped up to match that of engine 130 such that rotation of input shaft 106 causes rotation of inner race 138 at a speed that couples inner race 110 to outer race 112 via sprag elements 116. Now, torque is delivered from engine 102 and transmitted through sprag clutch 104 to output shaft 120, output gear 124, input gear 152 and gear system 154 to mast 156 as indicated by torque line 160b, as best seen in FIG. 3F. This represents both a preflight configuration and a flight configuration of multimode powertrain 100 with both engines 102, 130 providing power to main rotor assembly 12 and with sprag clutch 104 in the driving configuration.

Figure 4A:
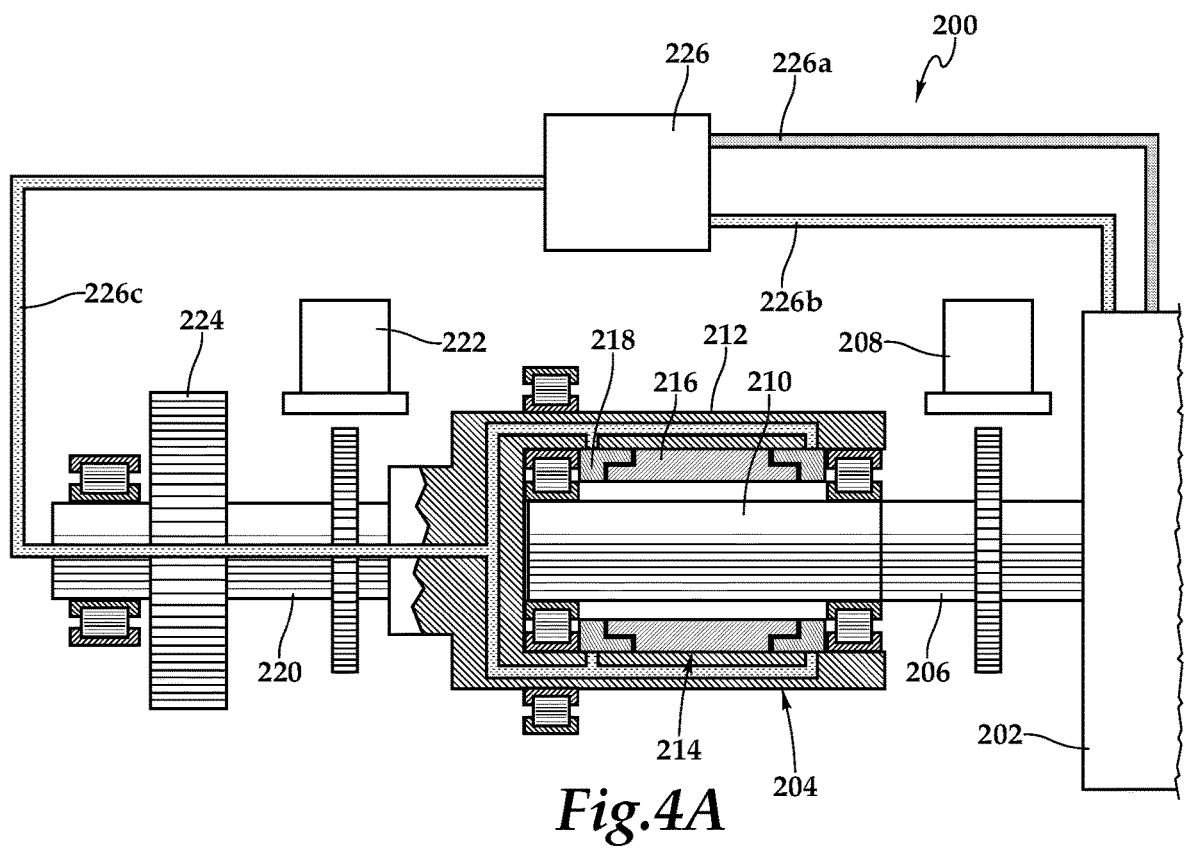
FIGS. 4A-4B are schematic illustrations of an actuation system for a multimode powertrain in accordance with embodiments of the present disclosure.
Figure 4B:
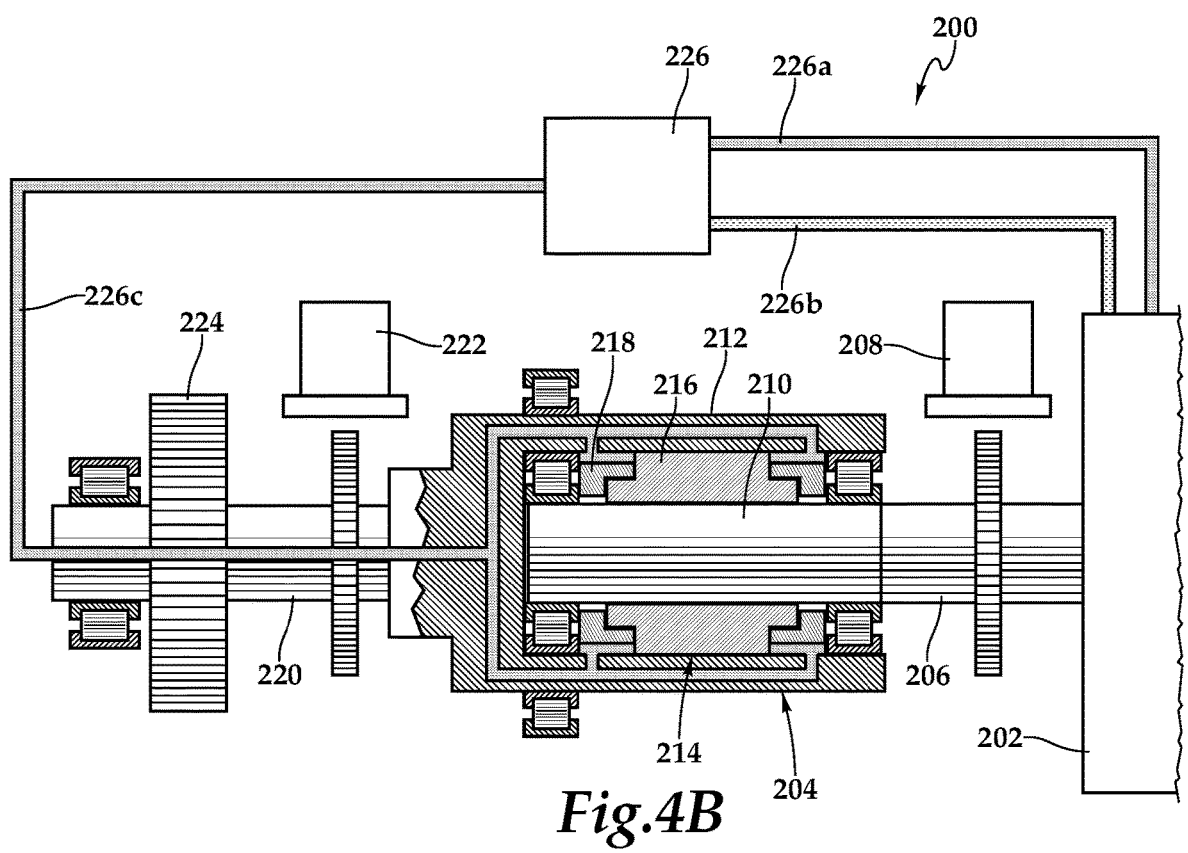

Referring to FIGS. 4A-4B in the drawings, a portion of a multimode powertrain for a rotorcraft is schematically illustrated and generally designated 200. In the illustrated portion, multimode powertrain 200 includes an engine 202 such as a turbo shaft engine capable of producing 2000 to 4000 horsepower or more, depending upon the particular implementation. Engine 202 is coupled to a freewheeling unit depicted as sprag clutch 204 via an input shaft 206. In the illustrated embodiment, input shaft 206 is coupled to a speed sensor 208 that is operable to detect the input side speed of sprag clutch 204 and communicate with flight control computer 42. Input shaft 206 is integral with or coupled to an inner race 210 of sprag clutch 204. Positioned radially outwardly from inner race 210, sprag clutch 204 includes an outer race 212. A sprag assembly 214 is retained in the radial space between inner race 210 and outer race 212. In the illustrated embodiment, sprag assembly 214 includes a plurality of circumferentially distributed sprag elements 216 and a plurality of lift elements 218, each of which is disposed between inner race 210 and outer race 212. Outer race 212 is integral with or coupled to an output shaft 220. In the illustrated embodiment, output shaft 220 is coupled to a speed sensor 222 that is operable to detect the output side speed of sprag clutch 204 and communicate with flight control computer 42. Output shaft 220 is also coupled to an output gear 224, which couples the output side of sprag clutch 204 to the main rotor gearbox of helicopter 10.

In the bypass configuration of sprag clutch 204 depicted in FIG. 4A, sprag elements 216 are disengaged from inner race 210. In this configuration, sprag elements 216 are unable to mechanically couple inner race 210 to outer race 212 regardless of the input side rotating speed such that torque is not coupled through sprag clutch 204 from the input side to the output side. Also in the bypass configuration, sprag clutch 204 has an overrunning mode wherein engine 202 is decoupled from main rotor assembly 12 when the input side rotating speed of sprag clutch 204 is less than the output side rotating speed of sprag clutch 204. Thus, in the bypass configuration, sprag clutch 204 acts as a fully disengaged clutch operable for no torque transfer in either direction.

In the driving configuration of sprag clutch 204 depicted in FIG. 4B, sprag elements 216 are pivoted by lift elements 218 such that sprag elements 216 can mechanically couple inner race 210 to outer race 212 by a wedging action when the input side rotating speed of sprag clutch 204 is matched with the output side rotating speed of sprag clutch 204. Also in the driving configuration, sprag clutch 204 has an overrunning mode wherein engine 202 is decoupled from main rotor assembly 12 when the input side rotating speed of sprag clutch 204 is less than the output side rotating speed of sprag clutch 204 such that sprag elements 216 are no longer wedged between inner race 210 to outer race 212. Operating sprag clutch 204 in the overrunning mode allows, for example, main rotor assembly 12 of helicopter 10 to engage in an autorotation and flare recovery maneuver, in the event of an engine failure. Thus, in the driving configuration, sprag clutch 204 acts as a one-way clutch operable for unidirectional torque transfer from the input side to the output side.

To shift sprag clutch 204 between the driving configuration and the bypass configuration, multimode powertrain 200 includes a hydraulic actuator 226, the operation of which is preferably controlled by flight control computer 42. In the illustrated embodiment, hydraulic actuator 226 is part of a fluid lubrication system for sprag clutch 204 that is operable to access pressurized oil from engine 202 via circulation loop 226a, 226b for fluid lubrication functionality via lubrication channels 226c. It is noted that in FIG. 4A, the low density stippling within lubrication channels 226c indicates a fluid pressure having a fluid pressure state that is insufficient to actuate sprag clutch 204 from the bypass configuration. In addition, hydraulic actuator 226 is operable to use the pressurized oil from engine 202 to actuate sprag clutch 204 from the bypass configuration. Hydraulic actuator 226 can provide fluid pressure having a fluid pressure state that is sufficient to actuate sprag clutch 204 from the bypass configuration, as indicated by the high density stippling within lubrication channels 226c in FIG. 4B. The high pressure fluid radially biases lift elements 218 inwardly which causes sprag elements 216 to pivot toward inner race 210 and thus enable engagement therewith. It is noted that sprag clutch 204 defaults to the bypass configuration and must be actuated to the driving configuration responsive to sufficient pressure.

Referring additionally to FIG. 5A in the drawings, a larger portion of multimode powertrain 200 is depicted. As stated herein, multimode powertrain 200 includes engine 202, sprag clutch 204, input side speed sensor 208, output side speed sensor 222 and output gear 224. Multimode powertrain 200 also includes an engine 230 such as a turbo shaft engine capable of producing 2000 to 4000 horsepower or more, depending upon the particular implementation. It is noted that engine 202 and engine 230 may have the same power rating or could have different power ratings. For example, engine 202 could have a lower power rating than engine 230 or engine 202 could have a higher power rating than engine 230. Engine 230 is coupled to a freewheeling unit depicted as sprag clutch 232 via an input shaft 234. In the illustrated embodiment, input shaft 234 is coupled to a speed sensor 236 that is operable to detect the input side speed of sprag clutch 230 and communicate with flight control computer 42. Input shaft 234 is integral with or coupled to an inner race 238 of sprag clutch 232. Positioned radially outwardly from inner race 238, sprag clutch 232 includes an outer race 240. A sprag assembly 242 is retained in the radial space between inner race 238 and outer race 240. In the illustrated embodiment, sprag assembly 242 includes a plurality of circumferentially distributed sprag elements 244, each of which is disposed between inner race 238 and outer race 240. Outer race 240 is integral with or coupled to an output shaft 246. In the illustrated embodiment, output shaft 246 is coupled to an output gear 248, which couples the output side of sprag clutch 232 to main rotor gearbox 250.

As sprag clutch 232 does not include lift elements, sprag clutch 232 does not have a bypass configuration but instead, only has a driving configuration in which sprag elements 244 mechanically couple inner race 238 to outer race 240 by a wedging action when the input side rotating speed of sprag clutch 232 is matched with the output side rotating speed of sprag clutch 232. Sprag clutch 232 has an overrunning mode wherein engine 230 is decoupled from main rotor assembly 12 when the input side rotating speed of sprag clutch 232 is less than the output side rotating speed of sprag clutch 232 such that sprag elements 244 are no longer wedged between inner race 238 and outer race 240. Operating sprag clutch 232 in the overrunning mode allows, for example, main rotor assembly 12 of helicopter 10 to engage in an autorotation and flare recovery maneuver, in the event of an engine failure. Thus, sprag clutch 232 acts as a one-way clutch operable for unidirectional torque transfer from the input side to the output side.

Output gear 224 and output gear 248 mesh with an input gear 252 in a combined gearbox that may be integral with or independent of main rotor gearbox 250. Main rotor gearbox 250 includes a gearbox housing and a reduction gear system 254, such as planetary gears, used to adjust the engine output speed to a suitable rotational speed for main rotor assembly 12 so that engine 202, engine 230 and main rotor assembly 12 may each rotate at optimum speed during flight operations of helicopter 10. Reduction gear system 254 is coupled to mast 256 that drives main rotor assembly 12 of helicopter 10.

Figure 5C:
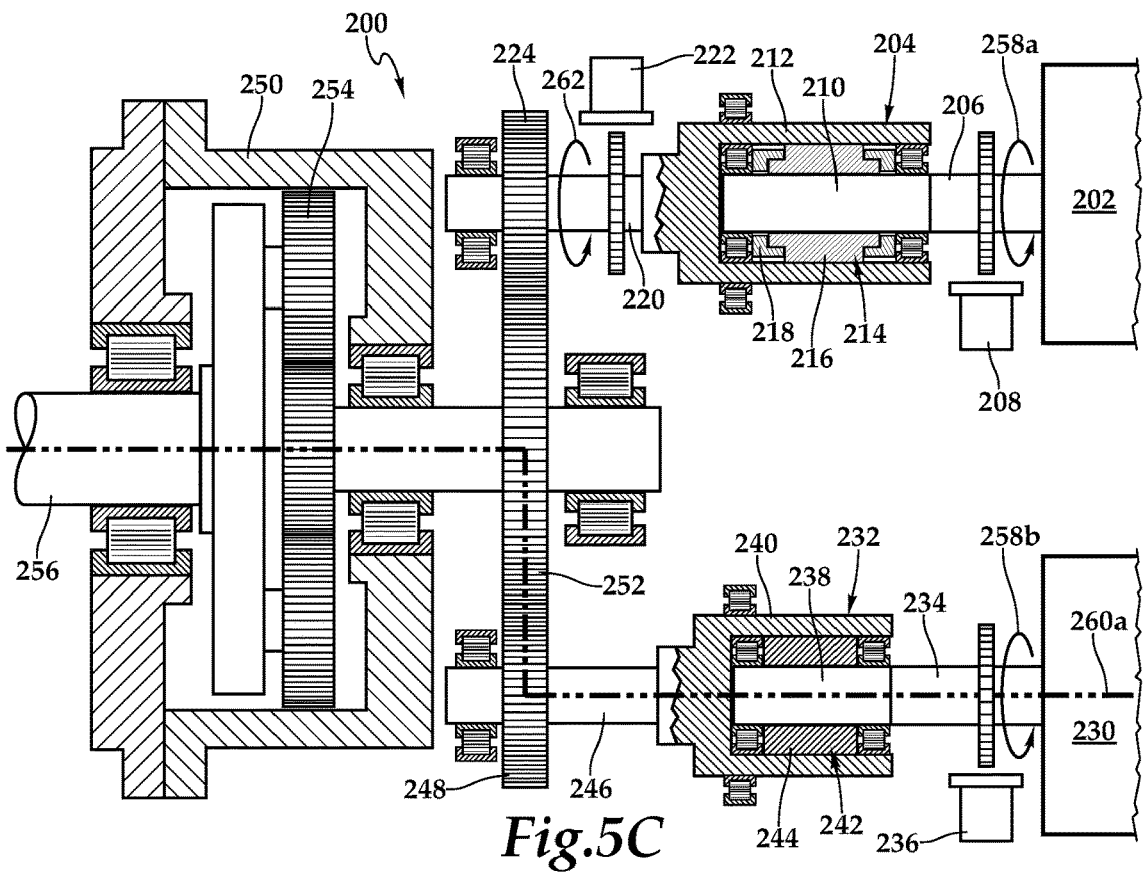

The operation of multimode powertrain 200 will now be described with reference to FIGS. 4A-4B and 5A-5D. FIG. 5A represents multimode powertrain 200 in a preflight configuration with neither of engines 202, 230 operating. In this resting state, sprag clutch 204 is in its default configuration which is the bypass configuration of sprag clutch 204. When it is desired to commence preflight operations of helicopter 10, certain of the accessories 40 of helicopter 10 must be turned on. In the illustrated embodiment, engine 202 provides power to accessories 40. As sprag clutch 204 is in the bypass configuration, engine 202 may be started and operated at a desired speed, such as idle speed, to power accessories 40, as best seen in FIG. 5B and as represented by arrow 258a. As sprag clutch 204 is in the bypass configuration, the rotation of input shaft 206 and inner race 210 is not coupled to outer race 212 and no torque is transmitted through sprag clutch 204 to output shaft 220.

In addition, engine 230 may be started and operated at a desired speed, preferably a speed of 102 percent to 105 percent of idle speed. Operation of engine 230 causes rotation of input shaft 234, as indicated by arrow 258b. This rotation causes rotation of inner race 238 which is coupled to outer race 240 as sprag clutch 232 is operating as a one-way clutch. Thus, torque is delivered from engine 230 and transmitted through sprag clutch 232 to output shaft 246, output gear 248, input gear 252 and gear system 254 to mast 256 as indicated by torque line 260a, as best seen in FIG. 5B. Input gear 252 also rotates output shaft 220, as indicated by arrow 262. The speed of output shaft 220 is generally matched to the speed of engine 230 when input gear 252 is driving output shaft 220. This represents a preflight configuration of multimode powertrain 200.

When it is desired to transition helicopter 10 from preflight operations to flight operations, power from engine 202 is supplied to main rotor assembly 12. This is achieved by first transitioning sprag clutch 204 from the bypass configuration to the driving configuration. In the illustrated embodiment, flight control computer 42 determines whether the input side rotating speed is less than the output side rotating speed of sprag clutch 204 based upon data from speed sensors 208, 222 and/or 236. Preferably, engine 202 is operating at idle speed and engine 230 is operating above idle speed such that the input side rotating speed is less than the output side rotating speed of sprag clutch 204. This speed relationship is desired for the transition from the bypass configuration to the driving configuration of sprag clutch 204 so that upon entry into the driving configuration, sprag clutch 204 will be in overrunning mode. If the data from speed sensors 208, 222 and/or 236 confirms the desired speed relationship, hydraulic actuator 226 uses pressurized engine oil from engine 202 to increase the fluid pressure state acting on lift elements 218 which radially inwardly biases lift elements 218 and pivots sprag elements 216 into an engaged relationship with inner race 210, as best seen in FIG. 5C. Sprag clutch 204 is now in the driving configuration operating in overrunning mode with no torque transfer therethrough. This represents a preflight configuration of multimode powertrain 200.

Figure 5D:
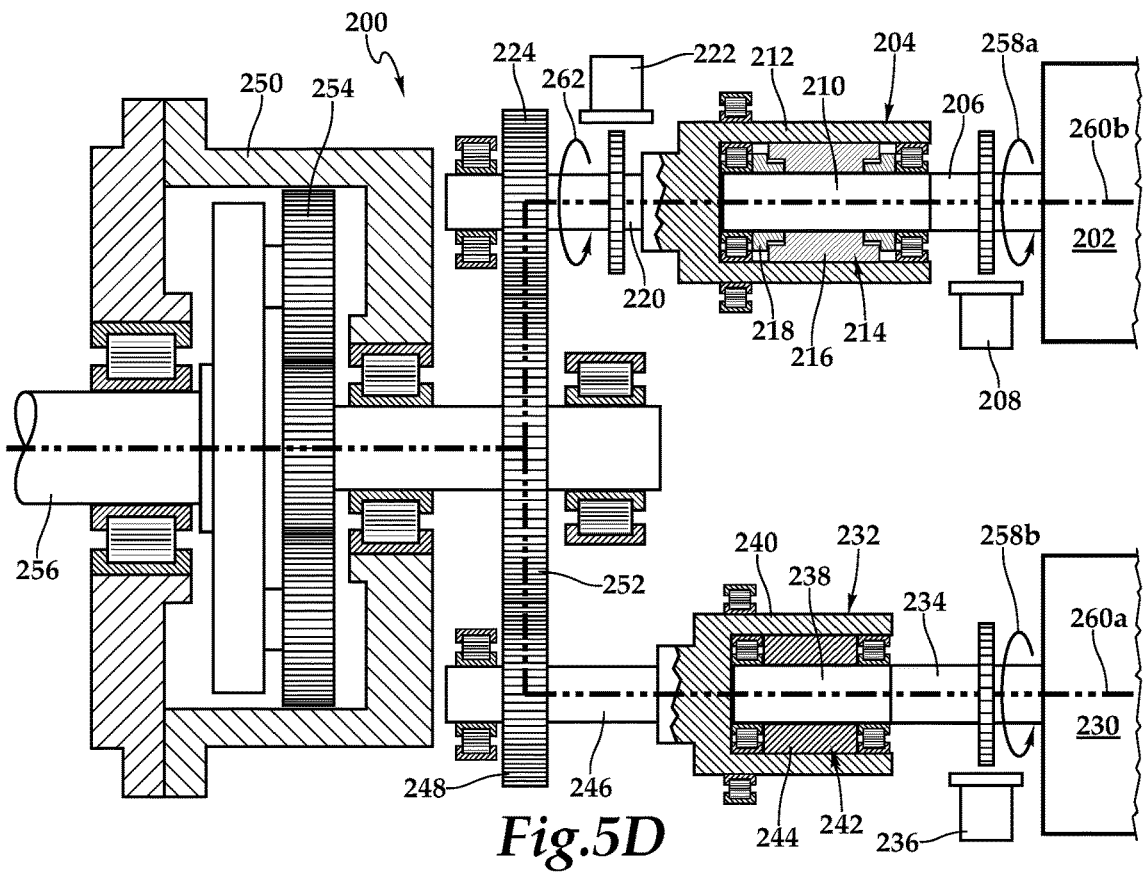

The operating speed of engine 202 may now be ramped up to match that of engine 230 such that rotation of input shaft 206 causes rotation of inner race 210 at a speed that couples inner race 210 to outer race 212 via sprag elements 216. Now, torque is delivered from engine 202 and transmitted through sprag clutch 204 to output shaft 220, output gear 224, input gear 252 and gear system 254 to mast 256 as indicated by torque line 260b, as best seen in FIG. 5D. This represents both a preflight configuration and a flight configuration of multimode powertrain 200 with both engines 202, 230 providing power to main rotor assembly 12 and with sprag clutch 204 in the driving configuration.

The flight control computer of the present embodiments preferably include computing elements such as non-transitory computer readable storage media that include computer instructions executable by processors for controlling flight operations. The computing elements may be implemented as one or more general-purpose computers, special purpose computers or other machines with memory and processing capability. The computing elements may include one or more memory storage modules including, but is not limited to, internal storage memory such as random access memory, non-volatile memory such as read only memory, removable memory such as magnetic storage memory, optical storage, solid-state storage memory or other suitable memory storage entity. The computing elements may be implemented as microprocessor-based systems operable to execute program code in the form of machine-executable instructions. The computing elements may be selectively connectable to other computer systems via a proprietary encrypted network, a public encrypted network, the Internet or other suitable communication network that may include both wired and wireless connections.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A powertrain for a rotorcraft having a main rotor and at least one auxiliary component, the powertrain comprising:
   first and second engines, the first engine coupled to the at least one auxiliary component;
   a transmission system including a main rotor gearbox, a first freewheeling unit coupling the first engine to the main rotor gearbox and a second freewheeling unit coupling the second engine to the main rotor gearbox; and
   a fluid lubrication system coupled between the first engine and the first freewheeling unit, the fluid lubrication system including a hydraulic actuator configured to access pressurized oil from the first engine and provide the pressurized oil to the first freewheeling unit;
   wherein, the first freewheeling unit has an input side coupled to the first engine and an output side coupled to the main rotor gearbox, the first freewheeling unit having a driving configuration in which torque applied to the input side is transferred to the output side and torque applied to the output side is not transferred to the input side and a bypass configuration in which torque applied to the input side is not transferred to the output side and torque applied to the output side is not transferred to the input side;
   wherein, the hydraulic actuator is configured to provide the pressurized oil to the first freewheeling unit at first and second fluid pressure states to shift the first freewheeling unit between the driving and bypass configurations;
   wherein, in a first preflight configuration of the rotorcraft, the first engine is engaged with the at least one auxiliary component, the first engine is disengaged from the main rotor with the first freewheeling unit in the bypass configuration and the second engine is engaged with the main rotor through the second freewheeling unit and the main rotor gearbox; and wherein, in a flight configuration of the rotorcraft, the first engine is engaged with the main rotor through the first freewheeling unit and the main rotor gearbox with the first freewheeling unit in a driving mode of the driving configuration and the second engine is engaged with the main rotor through the second freewheeling unit and the main rotor gearbox.

2. The powertrain as recited in claim 1 wherein the first engine has a first power rating and the second engine has a second power rating that is the same as the first power rating.

3. The powertrain as recited in claim 1 wherein the first engine has a first power rating and the second engine has a second power rating that is different from the first power rating.

4. The powertrain as recited in claim 1 wherein the first engine has a first power rating and the second engine has a second power rating that is greater than the first power rating.

5. The powertrain as recited in claim 1 wherein each of the first and second engines further comprises a gas turbine engine.

6. The powertrain as recited in claim 1 wherein the input side of the first freewheeling unit further comprises an inner race;
  wherein the output side of the first freewheeling unit further comprises an outer race;
  wherein the first freewheeling unit further comprises a sprag assembly disposed between the inner race and the outer race;
  wherein, in the driving configuration, the sprag assembly has an engaged position with the inner race; and
  wherein, in the bypass configuration, the sprag assembly has a disengaged position with the inner race.

7. The powertrain as recited in claim 6 wherein the hydraulic actuator is configured to provide -a the pressurized oil at the first fluid pressure state to operate the sprag assembly from the disengaged position to the engaged position and a to provide the pressurized oil at the second fluid pressure state to operate the sprag assembly from the engaged position to the disengaged position.

8. The powertrain as recited in claim 7 wherein the first fluid pressure state is a higher pressure state than the second fluid pressure state.

9. The powertrain as recited in claim 7 wherein the first fluid pressure state is a lower pressure state than the second fluid pressure state.

10. The powertrain as recited in claim 9 wherein the hydraulic actuator further comprises an electric motor.

11. The powertrain as recited in claim 9 wherein the hydraulic actuator further comprises a hydraulic accumulator.

12. The powertrain as recited in claim 1 wherein, in a second preflight configuration of the rotorcraft, the first engine is disengaged from the main rotor with the first freewheeling unit in an overrunning mode of the driving configuration and the second engine is engaged with the main rotor through the second freewheeling unit and the main rotor gearbox with the second engine operating at a higher speed than the first engine.

13. The powertrain as recited in claim 1 wherein, in a third preflight configuration of the rotorcraft, the first engine is engaged with the main rotor through the first freewheeling unit and the main rotor gearbox with the first freewheeling unit in the driving mode of the driving configuration and the second engine is engaged with the main rotor through the second freewheeling unit and the main rotor gearbox with the second engine operating at substantially the same speed as the first engine.

14. A rotorcraft comprising:
  a fuselage;
  a main rotor coupled to the fuselage and operable to rotate relative thereto;
  first and second engines;
  a transmission system including a main rotor gearbox coupled to the main rotor, a first freewheeling unit coupling the first engine to the main rotor gearbox and a second freewheeling unit coupling the second engine to the main rotor gearbox;
  at least one auxiliary component coupled to the first engine; and
  a fluid lubrication system coupled between the first engine and the first freewheeling unit, the fluid lubrication system including a hydraulic actuator configured to access pressurized oil from the first engine and provide the pressurized oil to the first freewheeling unit;
  wherein, the first freewheeling unit has an input side coupled to the first engine and an output side coupled to the main rotor gearbox, the first freewheeling unit having a driving configuration in which torque applied to the input side is transferred to the output side and torque applied to the output side is not transferred to the input side and a bypass configuration in which torque applied to the input side is not transferred to the output side and torque applied to the output side is not transferred to the input side;
  wherein, the hydraulic actuator is configured to provide the pressurized oil to the first freewheeling unit at first and second fluid pressure states to shift the first freewheeling unit between the driving and bypass configurations;
  wherein, in a first preflight configuration of the rotorcraft, the first engine is engaged with the at least one auxiliary component, the first engine is disengaged from the main rotor with the first freewheeling unit in the bypass configuration and the second engine is engaged with the main rotor through the second freewheeling unit and the main rotor gearbox; and
  wherein, in a flight configuration of the rotorcraft, the first engine is engaged with the main rotor through the first freewheeling unit and the main rotor gearbox with the first freewheeling unit in a driving mode of the driving configuration and the second engine is engaged with the main rotor through the second freewheeling unit and the main rotor gearbox.

15. The rotorcraft as recited in claim 14 wherein the input side of the first freewheeling unit further comprises an inner race;
  wherein the output side of the first freewheeling unit further comprises an outer race;
  wherein the first freewheeling unit further comprises a sprag assembly disposed between the inner race and the outer race;
  wherein, in the driving configuration, the sprag assembly has an engaged position with the inner race; and
  wherein, in the bypass configuration, the sprag assembly has a disengaged position with the inner race.

16. The rotorcraft as recited in claim 15 wherein the hydraulic actuator is configured to provide a the pressurized oil at the first fluid pressure state to operate the sprag assembly from the disengaged position to the engaged position and to provide the pressurized oil at the second fluid pressure state to operate the sprag assembly from the engaged position to the disengaged position.

17. The rotorcraft as recited in claim 14 wherein, in a second preflight configuration of the rotorcraft, the first engine is disengaged from the main rotor with the first freewheeling unit in an overrunning mode of the driving configuration and the second engine is engaged with the main rotor through the second freewheeling unit and the main rotor gearbox with the second engine operating at a higher speed than the first engine.

18. The rotorcraft as recited in claim 14 wherein, in a third preflight configuration of the rotorcraft, the first engine is engaged with the main rotor through the first freewheeling unit and the main rotor gearbox with the first freewheeling unit in the driving mode of the driving configuration and the second engine is engaged with the main rotor through the second freewheeling unit and the main rotor gearbox with the second engine operating at substantially the same speed as the first engine.

* * * * *

UNITED STATES PATENT AND TRADEMARK OFFICE
CERTIFICATE OF CORRECTION

PATENT NO. : 11,104,430 B2
APPLICATION NO. : 16/585891
DATED : August 31, 2021
INVENTOR(S) : Fenny et al.

Page 1 of 1

It is certified that error appears in the above-identified patent and that said Letters Patent is hereby corrected as shown below:

In the Claims

Column 13, Line 35:
"hydraulic actuator is configured to provide -a the pressurized" should read --hydraulic actuator is configured to provide the pressurized--

Column 13, Line 38:
"position and a to provide the pressurized oil at the second" should read --position and to provide the pressurized oil at the second--

Column 14, Line 63:
"hydraulic actuator is configured to provide a the pressurized" should read --hydraulic actuator is configured to provide the pressurized--

Signed and Sealed this
Fifth Day of October, 2021

Drew Hirshfeld
*Performing the Functions and Duties of the
Under Secretary of Commerce for Intellectual Property and
Director of the United States Patent and Trademark Office*